June 13, 1972          G. W. GILLEMOT          3,669,777
METHOD OF PROTECTING METAL-CLAD CABLES FROM
ATTACK BY STRAY CURRENTS
Filed June 23, 1969
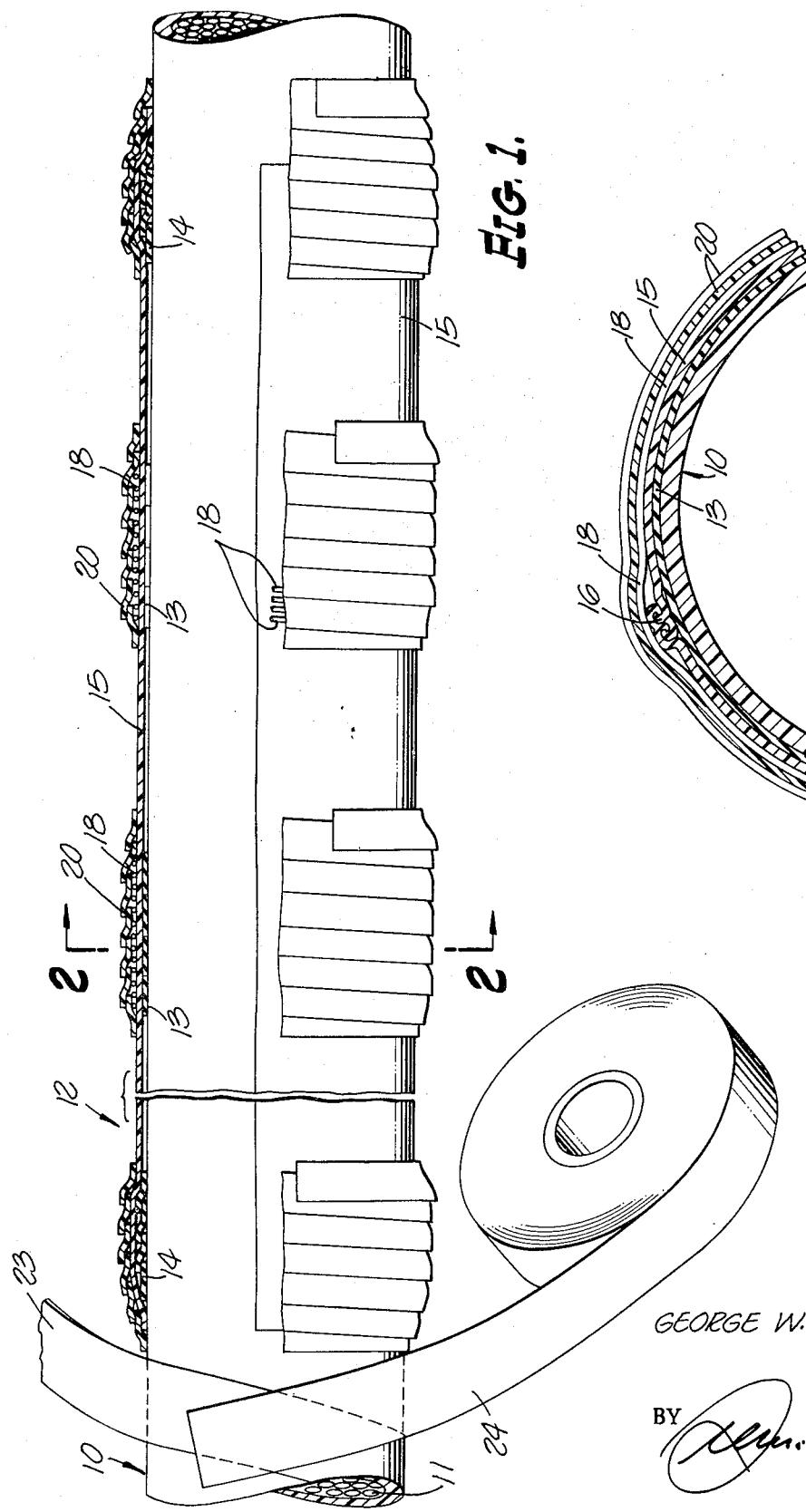
GEORGE W. GILLEMOT
INVENTOR
ATTORNEYS

United States Patent Office 3,669,777
Patented June 13, 1972

3,669,777
METHOD OF PROTECTING METAL-CLAD CABLES FROM ATTACK BY STRAY CURRENTS
George W. Gillemot, Venice, Calif., assignor to Walter A. Plummer, Sherman Oaks, Calif.
Filed June 23, 1969, Ser. No. 835,366
Int. Cl. H01b 13/26
U.S. Cl. 156—54                    5 Claims

ABSTRACT OF THE DISCLOSURE

A method of maintaining a sheathed cable in service by providing it with a protective enclosure of insulating material effective to isolate the cable from attack by stray currents while safeguarding the cable from loss of its pressurizing gas charge.

---

This invention relates to protection of sheathed cables and more particularly to a unique method of enclosing a length of cable subject to attack by electrolysis without need for taking the cable out of service.

Sheathed cables are sometimes pierced through accident or subject to erosion and electrolysis by stray electrical currents particularly where in contact with the ground. Thus, it is found that cable sheaths are attacked with increasing frequency by stray earth currents causing erosion of the cable sheath through electrolysis leading to failure of the cable and disruption of the service until the location of the failure can be pinpointed, the cable excavated and a new section spliced in place. Such failures are manifestly serious both from an economic standpoint and in disruption of service which, in the case of larger cables, can extend over a period of several days.

By the present invention there is provided a simple, inexpensive technique which can be employed to protect or continue damaged cables in service without need for disrupting service. The technique can be employed either as a preventative maintenance expedient as respects cables in locations known or likely to be subject to electrolytic action or attack by stray current conditions or adopted after corrosion has taken place provided the loss of pressure in the cable is detected before moisture reaches the interior of the cable. Thus when conventional cable monitoring equipment first detects a decrease in the cable gas pressure, steps are immediately taken to plot the leak and to uncover the section of cable involved. The damaged section of cable is then cleaned and the protective technique comprising the present invention is applied to provide the cable with a protective jacket capable of withstanding the internal gas pressure normally maintained within the cable. After the repaired section has been thoroughly checked it is returned to its former operating environment in the ground, the entire operation having been performed without need for interrupting service.

It is therefore a primary object of the present invention to provide an improved and unique technique for providing sheathed cables with a protective fluid-tight jacket.

Another object of the invention is the provision of a method of protecting metal clad cables against attack by stray currents without need for interrupting cable service, and for safeguarding damaged sections thereof against loss of cable pressure.

Another object of the invention is the provision of a repair technique for sheathed cables by which any length of the cable subject to hazardous conditions can be quickly and inexpensively jacketed with a cover of insulating material capable of withstanding the internal cable pressure and effective to isolate the sheath from attack by stray currents and other hazards.

These and other more specific objects will appear upon reading the following specification and claims and upon considering in connection therewith the attached drawing to which they relate.

Referring now to the drawing in which a preferred embodiment of the invention is illustrated.

FIG. 1 is an elevational view of a cable protected with the invention technique with portions of the protective covering broken away to show details of the jacket construction; and FIG. 2 is a fragmentary cross-sectional view on an enlarged scale taken along line 2—2 on FIG. 1.

Referring to FIGS. 1 and 2, there is shown a typical embodiment of the present invention applied to a length of sheathed cable 10 enclosing a multiplicity of conductors 11. The protective jacketing assembly 12 may be applied to the cable before it is buried in the ground, installed in ducting, or it may be applied after the cable has been placed in service along portions thereof likely to be subjected to electrolysis, hazardous stray current conditions or to puncture from any cause.

The first step in the protective procedure is to clean the exterior of the sheatht 10 thoroughly. This having been done, the workman applies at least one and preferably two wrappings 13 of a soft tacky sealing tape, as for example, Buna sealing tape commonly available with a layer of pressure sensitive adhesive and readily applied to the sheath with adjacent edges in close abutment with one another. Each of the wrappings comprises several edge-to-edge turns of tape 13 at closely spaced intervals inwardly from each end of the length of cabling to be jacketed. Only one end of the jacket assembly is shown in FIG. 1, it being understood that the other end is assembled in the same manner.

After sealing tape 13 has been applied to both ends of the area to be jacketed, the cable is enclosed in a unitary one-piece jacket of flexible sheet plastic material 15. Any suitable high-strength flexible elastomeric material having good insulating properties and capable of withstanding wide temperature changes and immune to attack by earth fluids is suitable. The opposite lateral edges of jacket 15 are provided with snugly interlocking tongue and groove seam forming means 16 to facilitate assembly of the jacket about a selected length of the cable. Prior to being pressed into assembled relation, the contacting surfaces of seam 16 are coated with a solvent or a sealant effective to seal the seam forming parts permanently assembled in a fluid tight manner. A number of such plastic seams are available commercially, the particular construction shown in FIG. 2 being typical and highly effective. Desirably jacket 15 should have a reasonably snug fit about the cable with a minimum of free space between the sheath surface and the jacket.

A third seal for each end of jacket 15 is provided by a serving of Buna tape 14 directly against the cable sheath applied before assembly of jacket 15 followed by a second serving of this tape applied after installation of jacket 15. Both servings are overlapped and are of sufficient length that approximately one-half of the two servings are located outwardly beyond the end of the jacket to assure firm anchorage and sealing of the jacket ends.

After the jacket has been properly assembled it is served along the portions opposite sealing tape 13 with closely spaced taut convolutions of strong banding material. The particular type of banding employed may vary; however, high strength rubber thonging 18 has been found highly satisfactory. This thonging is preferably applied under considerable tension about the portion of jacketing 15 directly opposite tape 13, the opposite ends being securely anchored in any suitable manner. The thong serving is preferably covered by a protective wrapping of tape 20, the principal function being to protect servings 18 from injury by foreign bodies or handling of the cable.

After both ends of the protective jacket 15 have been completed in the manner described in detail above the entire assembly is served with separate oppositely wrapped servings of wide tough tape 23, 24 with adjacent convolutions overlapped approximately one-half the width of tape. These wrappings protect jacket 15 against risk of puncture by contact with foreign objects and hazards encountered in placing the cable in its normal operating position. Additionally, the jacket 15 is strengthened to withstand the internal gas pressure of the cable in case the protected area of the sheath has or develops a gas leak.

Before returning the cable to its underground operating location, the jacketed length of the cable is subjected to close scrutiny and checking for leaks. If the cable sheath has not been pierced or perforated by erosion, the jacket will remain unpressurized and may be restored to its normal operation position without need for prolonged checking and testing.

It will be understood that the described jacket assembly 12 not only isolates the enclosed length of the cable from stray currents and electrolysis action but even if the cable sheath 10 should subsequently develop a leak for any reason, the jacket and the described method of applying the same to the cable is effective withstand the gas pressure of the gas charge commonly present for the purpose of preventing entry of moisture.

While the particular method of protecting sheathed cables from attack by stray currents herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. That method of protecting sheathed pressurized cabling from loss of its gas charge and the entrance of moisture without need for interrupting service of the cable which method comprises, cleaning a length of the sheath to be protected, applying axially spaced apart servings of resilient tacky material adjacent each end of the cleaned length of the sheath and to spaced apart intermediate zones, enclosing the cleaned length of sheath with a snug-fitting seamed tubular jacket of impervious strong, non-conductive flexible sheet material with the ends of said tubular jacket terminating inwardly of the remotely spaced edges of said servings of resilient tacky material, sealing said seam closed from end-to-end thereof, serving the terminal ends of said jacket with overlapping convolutions of sealing tape, serving short lengths of said jacket juxtaposed to said intermediate zones of servings of resilient tacky material with convolutions of tensioned thonging to clamp said jacket adjacent its opposite ends in a fluid tight manner to said tacky material and to the underlying surface of the cable sheath thereby to enclose the cleaned length of the cable with a fluid-tight supplemental gas charge retaining sheath.

2. That method defined in claim 1 characterized in the step of wrapping the exterior of said jacket with overlapped spiral convolutions of high-strength tape coated on its inner surface with pressure sensitive adhesive.

3. That method defined in claim 1 characterized in the steps of applying a plurality of oppositely spiralling wrappings of adhesive tape to the jacketed portion of said sheathed cabling and terminating beyond the ends of said jacket.

4. That method defined in claim 1 characterized in the step of utilizing elastomeric thonging to serve lengths of said jacket embracing said wrapping of said resilient tacky material.

5. That method defined in claim 1 characterized in that said cable sheath is of conductive material subject to attack by electrolysis, and locating said jacket about a length of said sheath exposed to stray electrical currents possibly productive of electrolytic action and electrolysis to provide a non-conductive barrier between the cable sheath and earth-borne stray currents.

References Cited

UNITED STATES PATENTS

| | | | |
|---|---|---|---|
| 2,161,036 | 6/1939 | Gremmel et al. | 156—187 |
| 2,374,514 | 4/1945 | Vincent | 156—56 |
| 2,924,546 | 7/1960 | Shaw | 156—187 |
| 3,127,291 | 3/1964 | Betz et al. | 156—49 |
| 2,936,257 | 5/1960 | Nailler et al. | 156—49 |
| 3,005,740 | 10/1961 | Halko, Sr. | 156—97 X |

FOREIGN PATENTS

| | | | |
|---|---|---|---|
| 163,571 | 6/1958 | Sweden | 156—56 |

CARL D. QUARFORTH, Primary Examiner

E. E. LEHMANN, Assistant Examiner

U.S. Cl. X.R.

156—56, 91, 172